Patented May 2, 1950

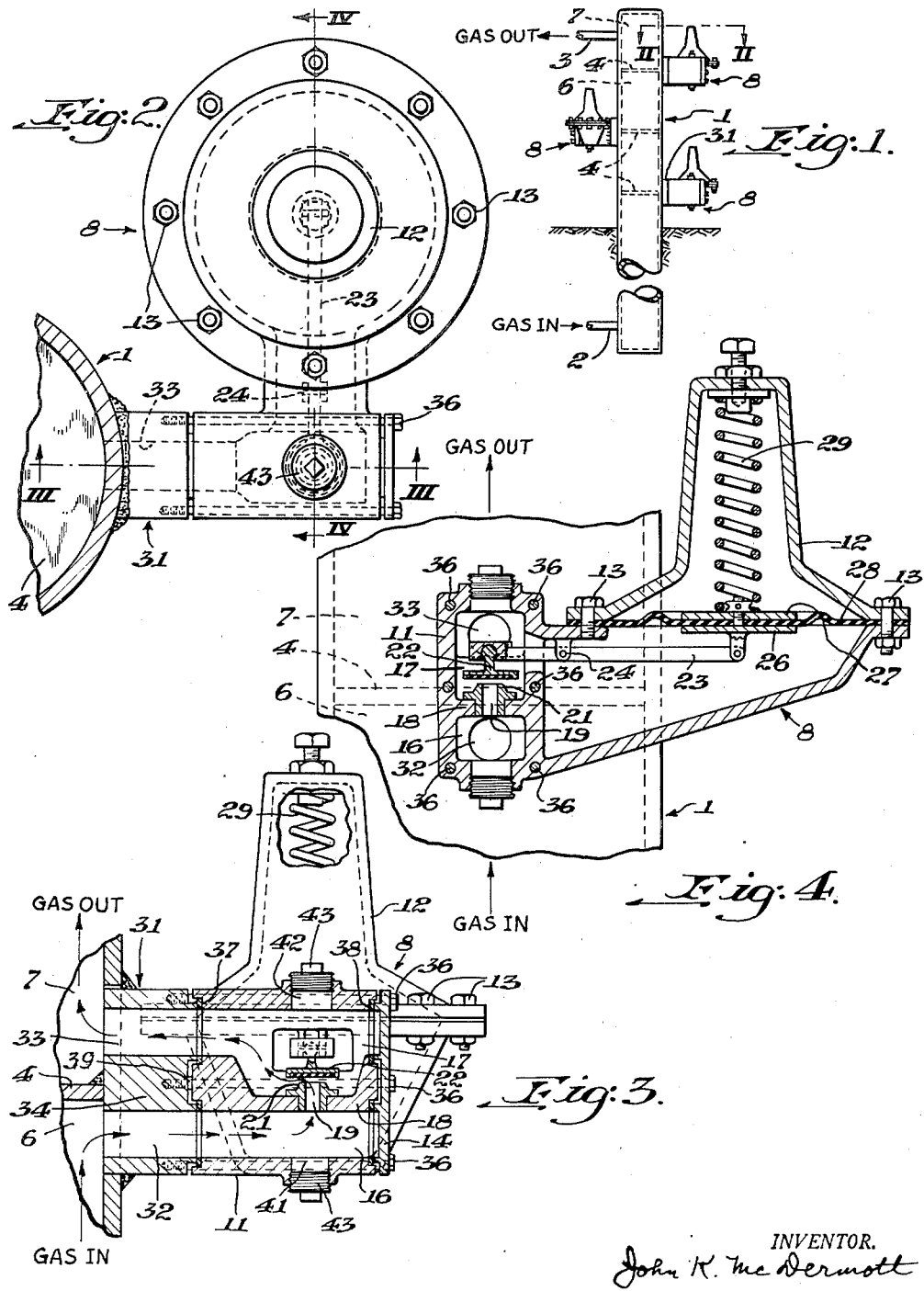

2,506,031

UNITED STATES PATENT OFFICE 2,506,031

GAS PRESSURE REGULATOR APPARATUS

John K. McDermott, Pittsburgh, Pa.

Application March 11, 1948, Serial No. 14,271

3 Claims. (Cl. 137—68)

This invention relates to apparatus for reducing gas line pressure between a gas main and a service line, and, more in particular, to an improved means for mounting the gas pressure regulators commonly used in such apparatus.

Such apparatus includes a reservoir or tank, which has an inlet connected to the main, and an outlet leading to the service line, or lines. The reservoir has a partition wall which divides it into high and low pressure compartments and the gas is constrained to flow from the one to the other through a pressure regulator which includes a spring-biased or weighted valve set to close when the pressure on the low side reaches a certain maximum.

One difficulty with such apparatus lies in properly connecting in the pressure regulators so as to avoid gas leaks, the regulators customarily being connected by pipes which lead from the high to the low pressure compartment. Such piping requires a large number of fittings including nipples, elbows and couplings, and the connections must be carefully aligned and kept in alignment or wasteful leaks will occur. Often too, the pipes or fittings are defectively bored so that leak-proof connections cannot be made. In addition to the leaks, an unnecessarily long time is required in making initially these numerous connections, and, also, in taking them apart for servicing and repair.

It is therefore among the objects of this invention to provide apparatus in which the pressure controlling mechanism can be quickly and easily connected; which permits ready dismounting for repair; which insures proper alignment of the passages through which the gas passes in its flow from one reservoir compartment to the other; which avoids gas leaks; and which securely supports the regulator.

According to the invention, the apparatus includes the usual reservoir which has a transverse partition dividing it into adjacent high and low pressure compartments. Further, the valve mechanism for regulating the gas pressure may be that used by many standard types now marketed. The principal improvement of the invention lies in the manner of connecting this mechanism between the reservoir pressure compartments. Thus, in place of the multiple pipes and fittings, an adaptor is provided which has a casing divided by a transverse wall into inlet and outlet passages. The casing is rigidly mounted, preferably welded, in an opening provided in the reservoir wall, and is so positioned that its transverse wall forms an unbroken continuation of the reservoir's partition wall. Consequently, the casing's inlet passage communicates with the reservoir's high pressure compartment, and the outlet with the low pressure compartment. A valve port through which the gas can flow from the high to the low reservoir compartment, is provided in the transverse wall of the casing, and a pressure controlled valve, such as those commonly used, is provided to close the port when the outlet pressure exceeds that desirable.

The preferred embodiment of the invention is illustrated in the accompanying drawings of which Fig. 1 illustrates the completely assembled and installed gas pressure reducing apparatus; Fig. 2 an enlarged plan view of a regulator taken on line II—II of Fig. 1; and Figs. 3 and 4 sectional views taken along the lines III—III and IV—IV respectively, of Fig. 2.

Referring to the drawings, the apparatus shown in Fig. 1, includes a reservoir, the lower portion of which may be embedded in the ground and connected by inlet pipe 2 to a gas main. At the upper part, an outlet pipe 3 is connected to a domestic user's service line. The outlet is separated from the inlet by a plurality of partitions 4 which divide the tank into several compartments, the lower of each adjacent compartment being the high pressure and the upper the low pressure compartment. For purposes of description, the top two compartments only will be considered, these being designated compartments 6 and 7.

The apparatus also includes gas pressure regulators 8 which contain the pressure controlling mechanism, and through which gas must flow in passing from one to the other compartment. The pressure mechanism, which will be only briefly described since it represents only one of many standard types, is shown in Figs. 3 and 4 as being enclosed in a casing which is in two parts 11 and 12 attached together by bolts 13. Part 11 has one end closed by a detachable plate 14 (Fig. 3), and is split into upper and lower, or inlet and outlet chambers 16 and 17 by a transverse wall 18. An opening, or valve port 19, is provided in this wall and a valve seat 21 mounted in the port. Valve 22 is positioned for closing the port and carries a resilient disc which seals the port when closed. The valve is attached to a horizontal rocker arm 23 (Fig. 4), which is pivoted on pin 24, mounted in brackets secured to the casing. The arm projects laterally and its end is secured to a pair of metal plates 26 and 27, between which is mounted a flexible diaphragm 28, that divides the parts 11 and 12 of the casing and has its marginal edges clamped between the parts. In part 12 of the casing there is mounted a compression spring 29 which exerts downward pressure in diaphragm plate 27 and moves arm 23 so as to cause valve 22 to be normally unseated and the port open. In operation, when the gas pressure in reservoir compartment 7 exceeds a predetermined amount, it pushes against diaphragm 28, overcomes the downward pressure of spring 29 and closes valve port 19 to shut off gas flow. When the pressure normalizes at the outlet side, the port again is opened by the spring.

An important feature of the invention is the manner of attaching the gas regulator to the reservoir. Thus, in place of the many pipe connections of the prior art, a simple, but unusually efficient adaptor member 31 is used. Exteriorly, it is preferable to shape this member to conform to the shape of the regulator. Interiorly, it is provided with lower inlet and upper outlet passages 32 and 33 extending transversely through it and these passages are separated by a transverse wall 34. One adaptor is used to secure each pressure regulator of the apparatus to the reservoir. The adaptor is secured in an opening provided for it in the side of the reservoir, the opening being made around each of the reservoir's partitions.

The reservoir, being made of ordinary pipe, is circular in cross-section and the inner end of the adapter, particularly its transverse wall, is shaped to fit into the opening of the circular pipe wall. The adaptor is so positioned in the opening that its transverse wall 34 abuts a reservoir partition 4 and forms an unbroken continuation of the partition. As a result, lower adaptor passage 32 communicates with the reservoir high pressure compartment, and upper passage 33 with the low. To secure the adaptor in its opening, first the inner end of its wall is welded to the reservoir's partition, and then the adjacent peripheral edge of the adaptor and the reservoir openings are welded together. This welding seals the opening, insures against leaks, and also firmly supports the adaptor. Commonly, reservoirs of the type here shown are made from pipe sections each of which has its upper end closed by what becomes the partition. Consequently, the welding of the adaptor wall to the partition may be done before the adjacent sections are connected one to the other.

Pressure regulators 8 are detachably secured to the adaptor by bolts 36. For this purpose, as shown in Figs. 3 and 4, the casing walls of the regulator and the adaptor are made thick enough that openings can be formed in them for receiving the bolts. These bolts also hold the regulator detachable plate 14 to the regulator so that, in repairing the regulator pressure controlling mechanism, the regulator can be detached from the adaptor and ready access had to such mechanism simply by removing the bolts. Circular gaskets 37 and 38 also are provided between the adaptor and the regulator and between the regulator and its detachable plate so as to reduce leakage. However, in order to insure that there will be no leakage from the high pressure compartment of the reservoir to its low pressure compartment, a vent 39 is provided.

Another convenience of this pressure controlling apparatus is that it can utilize the standard forms of pressure regulators. Thus, referring to Fig. 3, the regulator shown, according to prior teachings, would be connected in by means of piping received in its upper and lower openings 41 and 42. To use such a regulator with the adaptor of the present invention, it is only necessary to stop up these openings by means of plugs 43, and remove one of its end plates, to provide an open-ended regulator.

From the foregoing it now should be apparent that the use of the adaptor provided completely avoids the numerous pipe fittings and couplings of the prior art which, due to either defective boring or improper alignment, have resulted in wasteful and dangerous leaks. Further, the initial installation of the apparatus requires substantially less time than before and disassembly of the apparatus for repairs and servicing can be accomplished much more simply and quickly. In addition, a substantial saving in the cost of the apparatus is achieved since the adaptor requires less metal than prior pipe connections and also is more economic to manufacture. Another attendant advantage is that the pressure regulator mechanism is more rigidly supported so that jars or blows to which it may be subjected will not throw its parts out of alignment as often would be the case with a regulator connected into and supported by piping.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for reducing the pressure of gas between a high pressure main and a service line, comprising a reservoir having a transverse partition dividing it into adjacent high and low pressure compartments, an adaptor having a casing provided with a transverse wall separating it into inlet and outlet passages, said outlet passage communicating with said low pressure compartment and said inlet passage with said high pressure compartment, said adaptor casing being rigidly mounted in an opening provided for it in the wall of said reservoir in such a position that the transverse wall of the adaptor forms an unbroken continuation of said reservoir partition, and a gas pressure regulator having a transverse wall dividing it into inlet and outlet chambers, said regulator wall being provided with a port, and a pressure controlled valve for closing said port, said regulator having one of its ends open and having said end detachably connected to said adaptor with the regulator wall forming an unbroken continuation of said adaptor wall.

2. Apparatus for reducing the pressure of gas between a high pressure main and a service line, comprising a reservoir having a transverse partition dividing it into adjacent high and low pressure compartments, an adaptor having a casing provided with a transverse wall separating it into inlet and outlet passages, said outlet passage communicating with said low pressure compartment and said inlet passage with said high pressure compartment, said adaptor casing being mounted in an opening provided for it in the wall of said reservoir in such a position that the transverse wall of the adaptor forms an unbroken continuation of said reservoir partition, and being secured therein by welding the casing to the reservoir and the wall to the partition, and a gas pressure regulator having a transverse wall dividing it into inlet and outlet chambers, said regulator wall being provided with a port, and a pressure controlled valve for closing said port, said regulator having one of its ends open and having said end detachably connected to said adaptor with the regulator wall forming an unbroken continuation of said adaptor wall.

3. Apparatus for reducing the pressure of gas between a high pressure main and a service line, comprising a reservoir having a transverse partition dividing it into adjacent high and low pressure compartments, an adaptor having a casing provided with a transverse wall separating it into inlet and outlet passages, said outlet passage communicating with said low pressure compartment and said inlet passage with said high pressure compartment, said adaptor casing being mounted in an opening provided for it in the wall of said reservoir in such a position that the transverse wall of the adaptor forms an unbroken continuation of said reservoir partition, the adaptor being secured therein by welding the casing to the reservoir and the wall to the partition, and a gas pressure regulator having a transverse wall dividing it into inlet and outlet chambers, said regulator wall being provided with a port, a pressure controlled valve for closing said port, said regulator having one of its ends open and the other closed by a detachable plate, said open end being positioned against said adaptor with the regulator wall forming an unbroken continuation of said adaptor wall, and a plurality of bolts extending through aligned openings provided in said plate, regulator and adaptor, said bolts securing said members together, the joint between said adaptor and regulator being provided with a vent for preventing leakage of gas from the high to the low side of the reservoir.

JOHN K. McDERMOTT.

REFERENCES CITED

The following references are of record in the file of this patent:

UNITED STATES PATENTS

| Number | Name | Date |
|---|---|---|
| 2,320,104 | Simpson | May 25, 1943 |

FOREIGN PATENTS

| Number | Country | Date |
|---|---|---|
| 3,231 | Great Britain | Aug. 16, 1876 |